(12) United States Patent
Pullman et al.

(10) Patent No.: US 8,684,095 B2
(45) Date of Patent: Apr. 1, 2014

(54) GEOTHERMAL PIPE SETTING TOOL

(76) Inventors: Douglas G Pullman, Watford (CA);
Roger H Woods, Watford (CA)

(*) Notice: Subject to any disclaimer, the term of this patent is extended or adjusted under 35 U.S.C. 154(b) by 343 days.

(21) Appl. No.: 13/110,334

(22) Filed: May 18, 2011

(65) Prior Publication Data

US 2011/0284207 A1    Nov. 24, 2011

Related U.S. Application Data

(60) Provisional application No. 61/346,940, filed on May 21, 2010, provisional application No. 61/354,248, filed on Jun. 13, 2010.

(51) Int. Cl.
*E21B 7/20*    (2006.01)

(52) U.S. Cl.
USPC ........... 166/381; 166/313; 166/378; 166/380; 405/184

(58) Field of Classification Search
USPC ................ 166/313, 378, 380, 381; 405/184
See application file for complete search history.

(56) References Cited

U.S. PATENT DOCUMENTS 8,256,531 B1 * 9/2012 Biggs et al. ............... 175/15

* cited by examiner

*Primary Examiner* — Brad Harcourt
(74) *Attorney, Agent, or Firm* — Medler Ferro PLLC (57) ABSTRACT

A pipe setting tool includes a tool shaft, a coupler mounted on a first end of the tool shaft, and a tool sleeve affixed to the tool shaft defining a space therebetween. An outside diameter of the tool sleeve ensures close conformity to a borehole to position a geothermal pipe mounted thereto in close proximity to the outside diameter of the borehole. A moveable seal cap may be mounted on the tool shaft, moveable between a first position spaced-apart from the tool sleeve during downhole movement of the tool to permit fluid flow through the space and a second position against the tool sleeve during up-hole movement of the tool to establish a seal with the tool sleeve to prevent fluid flow through the space. A second end of the tool shaft may receive a pipe hook to attach a geothermal pipe to the pipe setting tool.

19 Claims, 11 Drawing Sheets

GEOTHERMAL PIPE SETTING TOOL

This application claims the benefit of U.S. Provisional Patent Application No. 61/346,940 filed May 21, 2010 and the benefit of U.S. Provisional Patent Application No. 61/354,248 filed Jun. 13, 2010, each of which is incorporated by reference herein in its entirety.

FIELD OF THE INVENTION

This invention relates generally to closed-loop geothermal systems, and more specifically to a geothermal pipe setting tool for setting closed-loop geothermal piping structures into drilled boreholes.

BACKGROUND OF THE INVENTION

Geothermal energy is clean, sustainable, and readily available in almost all populated regions of the world. There is growing interest in being able to effectively and efficiently harness this energy, particularly in view of the ever-increasing costs of fossil fuel derived energy.

Of particular interest is how geothermal energy can be used to both heat and cool buildings. On average, the upper 10 feet of the earth's surface maintains a nearly constant temperature between 50° F. and 60° F. (10° C. and 16° C.). Modern geothermal heating/cooling systems tap into this heat source to either extract heat energy during heating cycles, or to release or offload heat energy during cooling cycles. In addition to heating and cooling the building environment, geothermal systems can also be used to heat water.

Currently, modern geothermal heating/cooling systems are classified into four basic configurations. Three of these, generally termed horizontal, vertical, and pond/lake, are closed-loop systems, while the fourth configuration is an open-loop arrangement. Of these systems, the horizontal and vertical closed loop systems are commonly installed in the ground, wherein horizontal systems are generally placed within trenches, and vertical systems being placed into drilled boreholes.

Although various methods have been used to place geothermal piping into subsurface environments, there is growing evidence that the placement of the geothermal piping is a significant factor in achieving effective and efficient energy transfer. Mechanisms to facilitate and achieve proper placement are now required in the industry.

SUMMARY OF THE INVENTION

In accordance with an embodiment, a pipe setting tool is disclosed that includes a tool shaft, a coupler mounted on a first end of the tool shaft, a pipe hook configured for attachment to a second end of the tool shaft, a tool sleeve affixed to the tool shaft defining a space therebetween and a seal cap mounted on the tool shaft. The seal cap is moveable to a first position spaced-apart from the tool sleeve during down-hole movement of the pipe setting tool to permit flow of fluid through the space and the seal cap is moveable towards a second position against the tool sleeve during up-hole movement of the pipe setting tool to establish a seal with the tool sleeve and to prevent fluid flow through the space.

In accordance with another embodiment, a pipe setting tool includes a tool shaft, a coupler mounted on a first end of the tool shaft, a pipe hook configured for attachment to a second end of the tool shaft, and a tool sleeve affixed to the tool shaft defining a space therebetween. The tool sleeve is dimensioned with an outside diameter that ensures close conformity to a borehole, thereby serving to position a geothermal pipe mounted thereto in close proximity to the outside diameter of the borehole.

In another embodiment, the second end of the tool shaft is dimensioned to receive a consumable pipe hook used to attach a geothermal pipe to the pipe setting tool.

In accordance with another embodiment hereof, a method of setting a geothermal pipe in a blind borehole is disclosed that includes coupling a pipe setting tool to a terminal end of a drill string, directing the pipe setting tool down-hole into a drilled blind borehole, releasing hydraulic pressure down-hole during down-hole movement of the tool, ejecting the geothermal pipe at a target down-hole position in the borehole, pumping an encasement medium through the drill string and the tool to encase the geothermal pipe during up-hole movement of the tool, and displacing fluid up-hole of the tool out of the borehole during up-hole movement of the tool.

DESCRIPTION OF THE DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 3a is a side sectional view of the pipe setting tool of FIG. 2a.

DETAILED DESCRIPTION OF THE INVENTION

Specific embodiments of the present invention are now described with reference to the figures. The following detailed description is exemplary in nature and is not intended to limit the invention or the application and uses of the invention. In the following description, the terms "down-hole" and "downstream" are used with reference to boreholes and associated equipment to denote a direction or location towards the terminal or blind end, whereas the terms "up-hole" and "upstream" are used with reference to boreholes and associated equipment to denote a direction or location opposite the terminal or blind end. Although the description of the invention is in the context of closed loop geothermal systems, embodiments hereof may also be used in other applications where a structure is to be placed and embedded in blind boreholes. Furthermore, there is no intention to be bound by any expressed or implied theory presented in the preceding technical field, background, brief summary or the following detailed description.

Figure 1A:
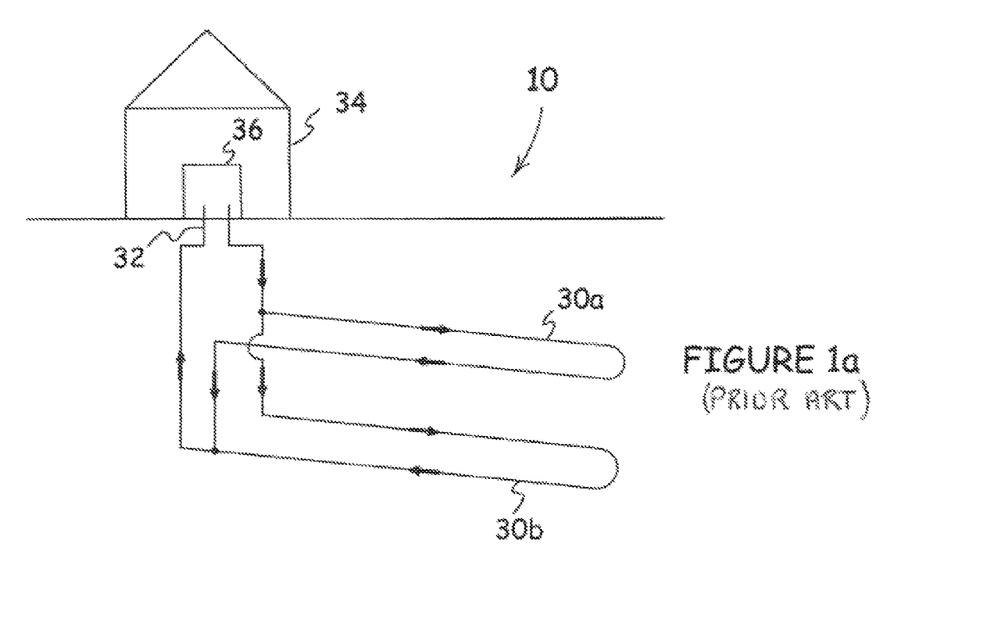
FIG. 1a is an exemplary horizontal closed-loop geothermal system.
Figure 1B:
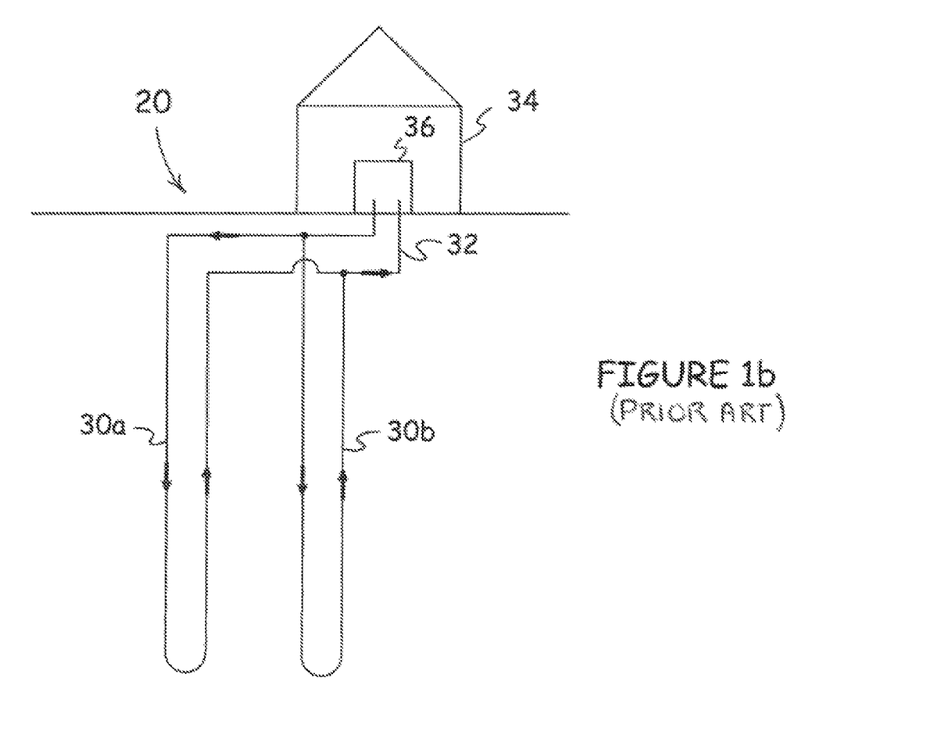
FIG. 1b is an exemplary vertical closed-loop geothermal system.

For establishing a general understanding of closed loop geothermal systems, provided in FIGS. 1a and 1b are two exemplary systems in common use today. The first arrangement shown in FIG. 1a is an exemplary horizontal loop system 10; the second arrangement shown in FIG. 1b is an exemplary vertical loop system 20. In each arrangement, the systems 10, 20 include two geothermal closed-loop structures 30a, 30b extending from a primary feed/return line 32. Generally housed within a structure 34 (e.g. a house or building), and attached to primary feed/return line 32 is a heat exchanger device 36. The closed-loop structure enables the flow of a suitable heat-exchange medium to effectively transfer heat energy between the sub-surface environment and heat exchanger device 36. As will be appreciated, geothermal systems are typically tailored to specific situations having regard to targeted heating/cooling performance. As such, geothermal systems may be configured to include fewer or greater numbers of closed-loop structures attached to primary feed/return line 32. For example, a simple geothermal loop system may have a single loop structure, while more complicated installations may have upwards of 5 or more loop structures attached in various configurations to one or more heat exchanger devices 36. As for installation of the loop structures into the ground, a variety of methodologies exist in the field. For example, a common approach for horizontal systems is to position the loop structures in trenches. In addition, while closed loop geothermal systems are generally regarded as being either horizontally or vertically arranged, alternate configurations between these arrangements is also possible, such as arranging the loop structures at 45° angles through the ground.

In general, a pipe setting tool in accordance with embodiments hereof is intended to facilitate the placement and setting of closed-loop geothermal loop structures, generally referred to in the following description as geothermal pipe into corresponding drilled boreholes. The pipe setting tool is configured to be affixed to a terminal end of either a drill string of a drill rig, or to a separate string of insertion rods which are generally manipulated manually by site workers. For sake of simplicity, the following description refers to both configurations generally as a drill string. As will be described in greater detail below, the pipe setting tool is specially configured to engage the geothermal pipe in a manner that facilitates the controlled movement of the geothermal pipe downhole with the drill string. The pipe setting tool further serves to effectively set or embed the geothermal pipe in an encasement medium (e.g. a thermally conductive medium such as thermal grout), thereby enhancing the overall thermal efficiency of the closed-loop system.

Figure 2A:
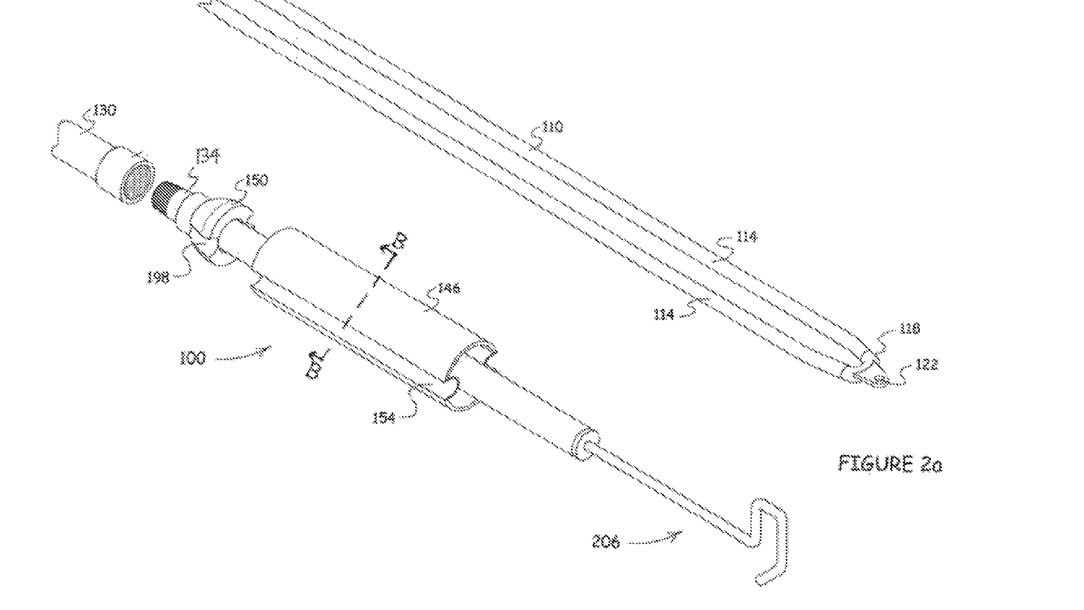
FIG. 2a is a perspective view of a pipe setting tool in accordance with an embodiment hereof with a geothermal pipe ready for mounting.
Figure 2B:
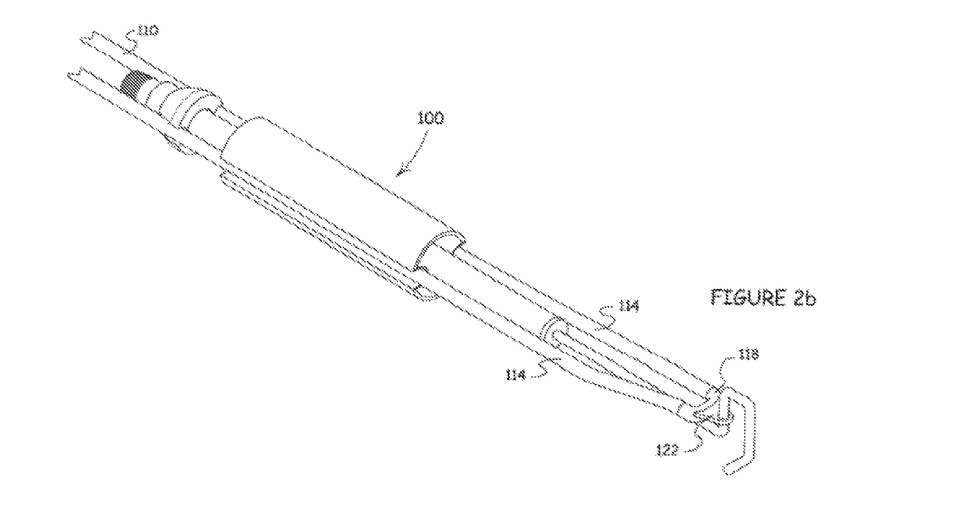
FIG. 2b is a perspective view of the pipe setting tool of FIG. 2a showing the geothermal pipe mounted and ready for installation.

FIGS. 2a and 2b depict pipe setting tool 100 in accordance with an embodiment hereof. In FIG. 2a, pipe setting tool 100 is readied for engagement with geothermal pipe 110. In closed-loop systems, geothermal pipe 110 generally comprises a pair of tube sections 114 that fluidly connect to the heat exchanger device at the surface. In the borehole, the pair of tube sections 114 fluidly connect to each other at elbow 118. As such, the pair of tube sections 114 permits the circulation of a suitable heat exchange medium through the geothermal pipe 110 as is generally known in the art. At elbow 118 there is provided a pull eye or aperture 122 or similar structure permitting attachment of geothermal pipe 110 to pipe setting tool 100. FIG. 2b presents pipe setting tool 100 with geothermal pipe 110 mounted and ready for placement into the borehole.

Figure 3A:
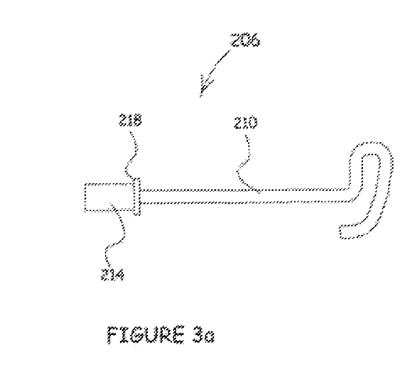

Turning now to FIG. 3a, pipe setting tool 100 has a tubular or hollow tool shaft 126 configured to releasably attach to the downstream terminal end of a drill string 130 by way of a coupler 134 mounted on a first end 138 of tool shaft 126. As generally known in the field, drill string 130 includes a series of hollow drill components that permit the downstream flow of drilling fluid during drilling operations. Accordingly, coupler 134 and tool shaft 126 are similarly configured to permit fluid communication downstream, as will be explained in greater detail below. Coupler 134 is generally a hollow body, and is provided with a coupling interface 142 to facilitate releasable attachment to drill string 130. Coupling interface 142 may be configured a number of ways, and is not meant to be limited to just one configuration. In one exemplary embodiment, coupling interface 142 enables for a threaded connection of coupler 134 to drill string 130.

Figure 3B:
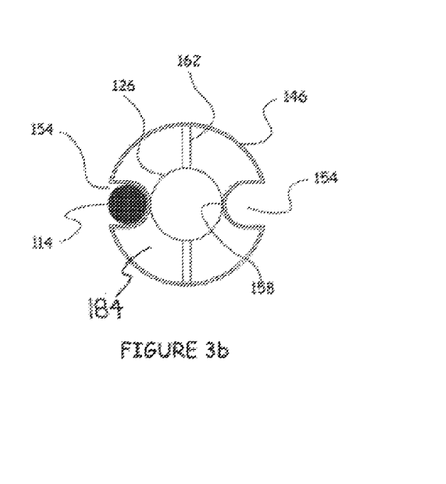
FIG. 3b is a cross-sectional view of the pipe setting tool of FIG. 2a taken along line B-B showing the channel configuration of the tool sleeve.

Pipe setting tool 100 further includes a tool sleeve 146 and a sliding seal cap 150. Tool sleeve 146 is fixedly mounted to tool shaft 126, and has at least 2 longitudinal channels or grooves 154 configured on opposite sides, as detailed more clearly in FIG. 3b. Tool sleeve 146 is generally configured with an outside diameter that ranges in size from being substantially the same size to just marginally smaller than the inside diameter of the borehole into which it is to be inserted. Longitudinal channels 154 are configured to receive the tube sections 114 of the geothermal pipe 110 (only 1 tube structure 114 shown in FIG. 3b). As such, each channel 154 has a depth that permits seating of a respective tube section 114, without allowing each respective tube section 114 to protrude from the surface of tool sleeve 146. In addition, each channel 154 is further sized to permit respective tube sections 114 to slide therein during up-hole movement of the tool as explained in greater detail below. Tool sleeve 146 is retained on tool shaft 126 by any suitable means. For example, tool sleeve 146 may be retained on tool shaft 126 by way of metallurgic bonding (e.g. welding) at the point of contact 158 between tool shaft 126 and tool sleeve 146. Alternatively, tool sleeve 146 may be retained on tool shaft 126 by way of suitable fasteners, such as threaded fasteners or rivets. As will be appreciated, the manner by which tool sleeve 146 is retained on tool shaft 126 is not meant to be limited to any specific methodology, and all manners by which this may be accomplished are contemplated herein. The placement of tool sleeve 146 on tool shaft 126 may be facilitated by one or more internal supports 162 situated between tool shaft 126 and tool sleeve 146. Internal supports 162 are configured to permit fluid communication through pipe setting tool 100, as will be explained in greater detail below. Although shown in FIG. 3b as concentrically aligned, in some embodiments, tool shaft 126 and tool sleeve 146 may be eccentrically aligned.

Tool sleeve 146 is provided on a first end 166 with a shoulder 170 that defines a first opening 174 between tool sleeve 146 and tool shaft 126. At a second end 178 of tool sleeve 146, provided is an inward taper 182 that defines a second opening 186 between tool sleeve 146 and tool shaft 126. Inward taper 182 serves to facilitate downstream movement by stabilizing the pipe setting tool 100, as well as centering it in the borehole. With the above-noted configuration, it will be appreciated that fluid is permitted to flow through each opening 174, 186 and through a space 184 defined between tool shaft 126 and tool sleeve 146.

Figure 3C:
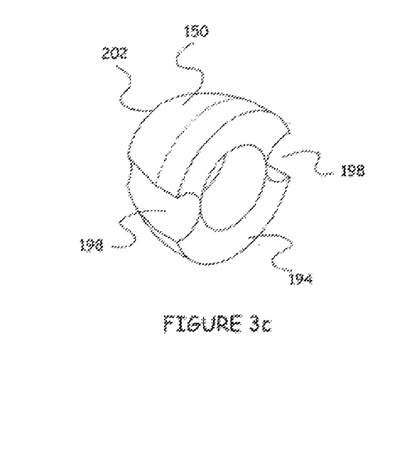
FIG. 3c is a perspective view of a seal cap in accordance with an embodiment hereof showing the channel configuration.

Shoulder 170 provided on first end 166 of tool sleeve 146 defines a sealing surface 190 for cooperative sealing engagement with seal cap 150. Seal cap 150 is slidably mounted on tool shaft 126 in a manner that permits free-sliding movement between sealing surface 190 of tool sleeve 146 and coupler 134. In various embodiments, an additional stop mechanism, for example a stop collar (not shown) is provided adjacent to coupler 134, or intermediate of coupler 134 and sealing surface 190 to prevent direct engagement between seal cap 150 and coupler 134. To permit the aforementioned cooperative sealing engagement between tool sleeve 146 and seal cap 150, seal cap 150 is similarly configured with a sealing surface 194. As shown more clearly in FIGS. 2a and 3c, seal cap 150 is also configured with channels 198 that correspond in position and size to the channels 154 provided in tool sleeve 146. In the embodiment shown, on the end opposite sealing surface 194, seal cap 150 is configured with a generally hemispherical head 202, so as to aid in stabilizing the tool 100 and centering it in the borehole. As will be appreciated, other configurations for head 202 are possible, such as a substantially planer head with chamfered edges. All such alternate configurations are contemplated for use in pipe setting tool 100. To further facilitate movement of pipe setting tool 100 through a borehole, seal cap 150 is generally provided with a diameter that is smaller than that of tool sleeve 146, but large enough to permit effective sealing with shoulder 170 of tool sleeve 146. In other words, seal cap 150 is generally sized to permit sufficient overlap so as to achieve effective sealing between sealing surface 194 of seal cap 150 and sealing surface 190 of tool sleeve 146.

In FIG. 3a tool shaft 126 is shown generally extending beyond second end 178 of tool sleeve 146. Configured for engagement with the second end 204 of tool shaft 126 is a pipe hook 206 that includes a shaft portion 210 affixed to a plug 214. Plug 214 is generally configured as an insert member having a suitable outside diameter to slidably fit within tool shaft 126. Plug 214 is further provided with a flange 218 affixed to plug 214 to limit insertion of plug 214 into tool shaft 126. Extending from plug 214 is the shaft portion 210 suitably configured to permit engagement with geothermal pipe 110, as initially detailed in FIGS. 2a and 2b. Although generally described above as including an insert member, i.e., plug 214, to facilitate attachment of pipe hook 206 to tool shaft 126, pipe hook 206 could be alternately configured with a sleeve member that slides over a portion of second end 178 of tool sleeve 146.

In the installation of a geothermal closed loop system, as is generally known in the art, a drill rig drills the horizontal or vertical hole(s) into the ground to the desired length or depth. In the process of drilling, a drilling fluid is pumped through the drill string to flush excavated soil from the borehole and to lubricate the borehole and drill head. Once the drilling operation is complete, the drill string and drill head are backed out of the hole, thereby leaving an open hole containing drilling fluid to maintain the integrity of the hole.

Referring back to FIGS. 2a and 2b, in the next stage of installation, pipe setting tool 100 is installed onto the end of drill string 130 via coupler 134. The pipe setting tool 100 is then readied for installation of geothermal pipe 110 by mounting geothermal pipe 110 onto pipe hook 206. As shown, shaft portion 210 is configured with bent forward end 226 that permits engagement with pull eye 122. Each tube section 114 extending from the elbow is situated in corresponding channels 154, 198 of tool sleeve 146 and seal cap 150, respectively.

Figure 4:
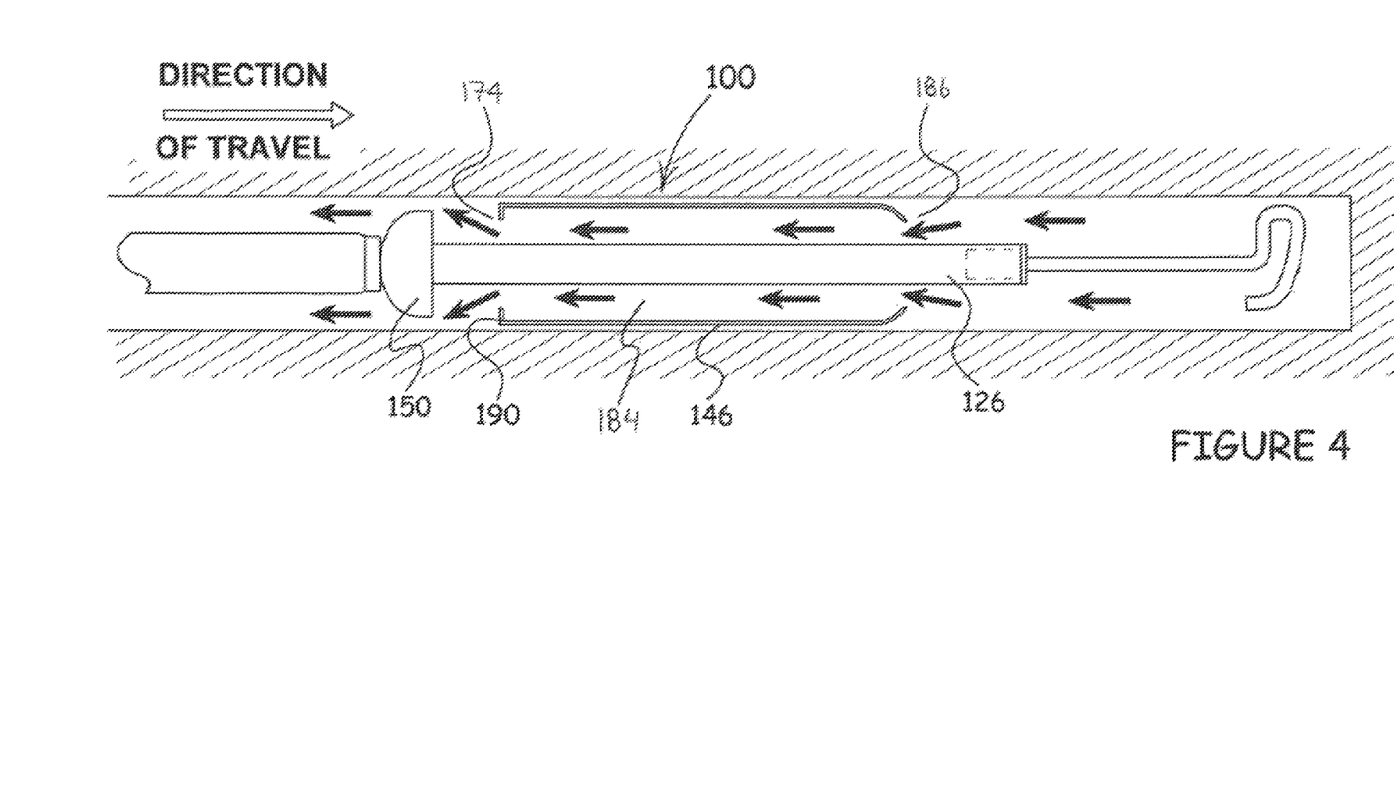
FIG. 4 is a schematic representation of the pipe setting tool of FIG. 2a during downstream travel into a borehole.

With the geothermal pipe 110 mounted on the pipe setting tool 100, the drill string 130 is then pushed into the previously drilled borehole. As mentioned earlier, the outside diameter of tool sleeve 146 is generally in the range of being substantially the same size to marginally smaller than the inside diameter of the drilled borehole. In FIG. 4 that shows pipe setting tool 100 with geothermal pipe 110 removed for clarity, pipe setting tool 100 is shown pushed into the borehole such that fluid contained in the borehole is able to flow through opening 186, through space 184 of pipe setting tool 100 between tool sleeve 146 and tool shaft 126 and out opening 174 in the upstream direction. The force of the drill fluid flowing through opening 186 forces seal cap 150 to slide along tool shaft 126 to a first position spaced-apart from sealing surface 190, thereby allowing the drill fluid to flow upstream of pipe setting tool 100. This action of allowing the drill fluid to flow through and upstream of pipe setting tool 100 during downward movement into the borehole serves to relieve hydraulic pressure build-up downstream of the tool. In the absence of this feature, as is known in the art, a piston effect could arise in the borehole, causing drill fluid to effectively breach the borehole, causing leakage or blow-out to the above ground.

Figure 5:
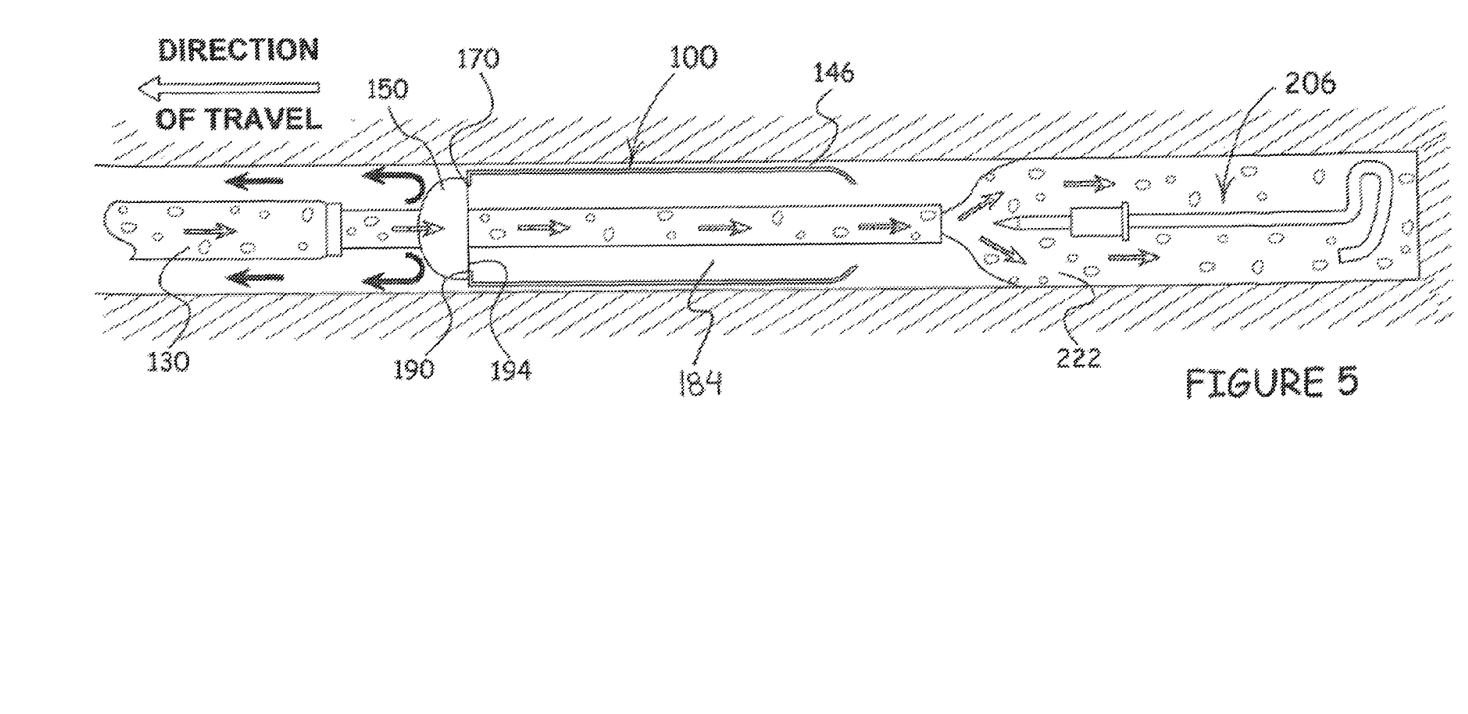
FIG. 5 is a schematic representation of the pipe setting tool of FIG. 2a during upstream travel in a borehole.

Once the drill string has advanced pipe setting tool 100 to the terminal or blind end of the borehole, an encasement medium (e.g. a thermally conductive medium such as thermal grout) 222 is pumped down drill string 130. As encasement medium 222 is pumped down the drill string 130, the drill string 130 begins to slowly pull back upstream. As detailed in FIG. 5 that also shows pipe setting tool 100 with geothermal pipe 110 removed for clarity, pipe setting tool 100 is shown pulled in an upstream direction by drill string 130, and by virtue of the forward pressure placed on drill string 130 caused by the pumping of encasement medium 222, pipe hook 206 is ejected from pipe setting tool 100 thereby remaining stationary, along with geothermal pipe 110 at the terminal or blind end of the borehole. As such, on up-hole movement of pipe setting tool 100, tube sections 114 of geothermal pipe 110 slide through respective channels of tool sleeve 146 and seal cap 150. Since pipe hook 206 remains in the borehole, pipe hook 206 is generally regarded as a consumable product.

Figure 6:
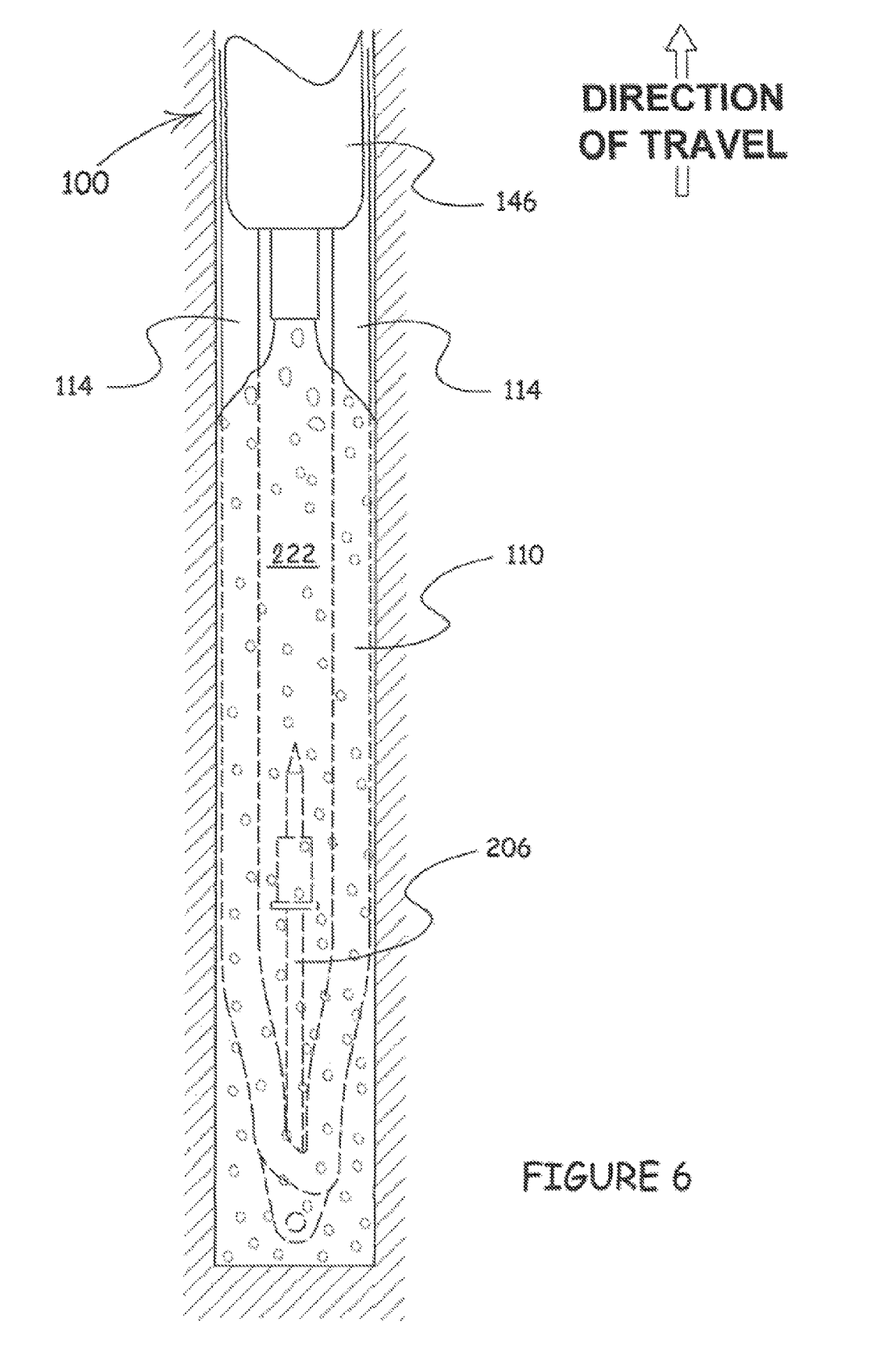
FIG. 6 is a schematic representation of the geothermal pipe set in an encasement medium in a borehole.

As pipe setting tool 100 continues to be pulled in an upstream direction, in other words up-hole by drill string 130, the drill fluid in the borehole upstream of pipe setting tool 100 is forced upwards. This upstream movement causes a downstream force on seal cap 150, causing seal cap 150 to slide along tool shaft 126 towards a second position adjacent shoulder 170 of tool sleeve 146. A seal is established therebetween by way of sealing surfaces 190, 194 preventing ingress of the upstream drill fluid into and through space 184 of pipe setting tool 100. This creates a piston effect upstream of pipe setting tool 100, thereby causing drilling fluid to be displaced upstream and out of the borehole. Concurrently, as pipe setting tool 100 is pulled upwards and encasement medium 222 is pumped into the downstream area, geothermal pipe 110 is encased within the borehole, as shown in FIG. 6. As will be appreciated, pipe setting tool 100 serves as a mechanical barrier that effectively separates the drilling fluid from the encasement medium 222, thereby reducing cross-contamination. The pipe setting tool 100 further serves to clear the borehole of rocks and other debris by pushing larger rocks down-hole during down-hole placement and by driving smaller rocks and debris up-hole with the drill fluid during up-hole movement of the tool.

As pipe setting tool 100 is pulled in the upstream direction, the close conformity of tool sleeve 146 to the walls of the borehole serves to position each tube section 114 of geothermal pipe 110 in close proximity to the outside diameter of the borehole. As such, and as a result of the encasement medium 222 filling the void space downstream of pipe setting tool 100, the tube sections 114 of geothermal pipe 110 remains spaced apart, and generally untwisted, serving to enhance their thermal conductivity and efficiency. The ability of pipe setting tool 100 to achieve this arrangement is significant as geothermal research has shown that improved performance is achieved when tube sections 114 of each geothermal pipe 110 is positioned tight to the outside of the borehole, and to have the tube sections 114 run parallel and generally untwisted relative to each other.

The pipe setting tool 100 described herein is generally manufactured of a suitable metal, a non-limiting example of which is steel. Alternative materials are also contemplated such as suitable plastics and resin materials, including but not limited to fiberglass-based resins. Still further options are contemplated where such materials demonstrate the capability to withstand the rigors of tool use. In some embodiments, pipe setting tool 100 may be formed from a combination of materials. In one non-limiting example, pipe hook 206 may be manufactured in whole, or in part of a plastic or resin material to decrease the cost of this generally consumable component. In a further non-limiting example, other components such as sliding seal cap 150 may also be made of a polymer or resin material.

Figure 7A:
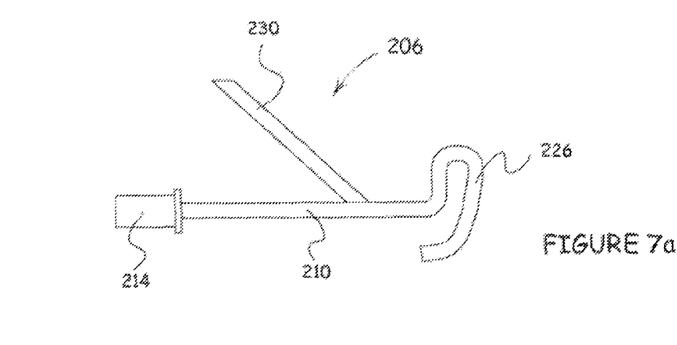
FIG. 7a is a side view of a pipe hook in accordance with another embodiment hereof having an exemplary anchor mechanism on the shaft portion of the fixture.
Figure 7B:
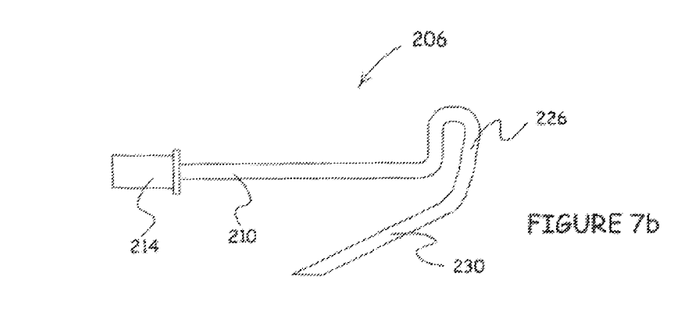
FIG. 7b is a side view of a pipe hook in accordance with another embodiment hereof having an alternate anchor mechanism located at the terminal end of the bend forward end.
Figure 7C:
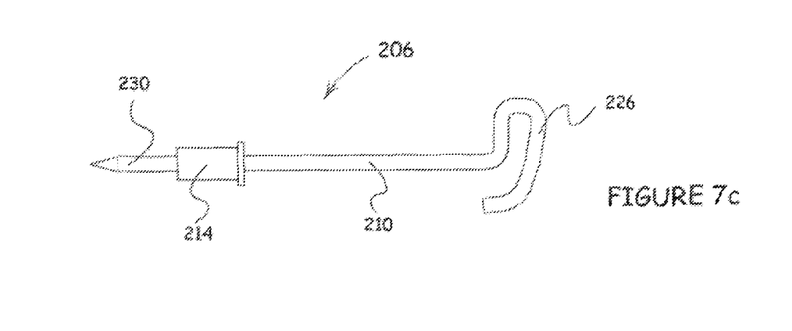
FIG. 7c is a side view of a pipe hook in accordance with another embodiment hereof having an alternate anchor mechanism extending from the plug opposite the shaft portion.
Figure 7D:
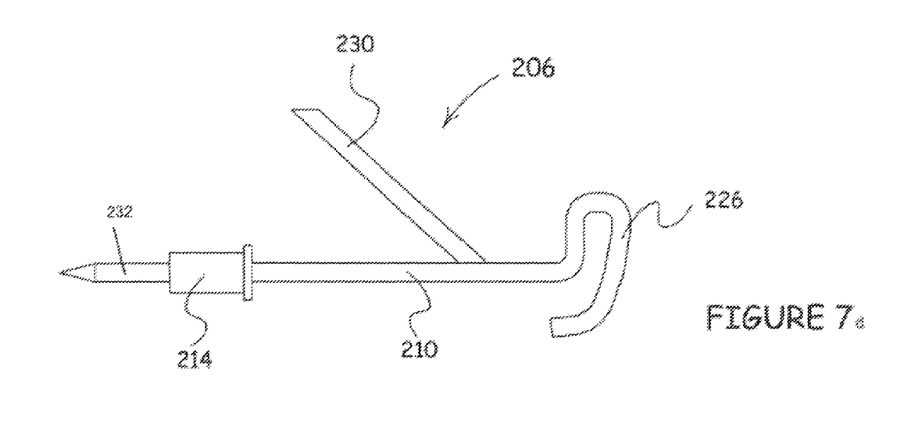
FIG. 7d is a side view of a pipe hook in accordance with another embodiment hereof having a combination of exemplary anchor mechanisms.
Figure 7E:
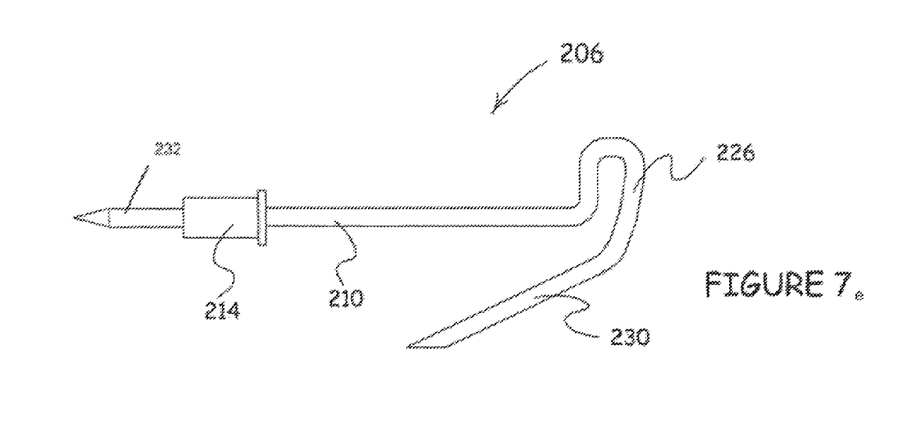
FIG. 7e is a side view of a pipe hook in accordance with another embodiment hereof having a combination of exemplary anchor mechanisms.
Figure 7F:
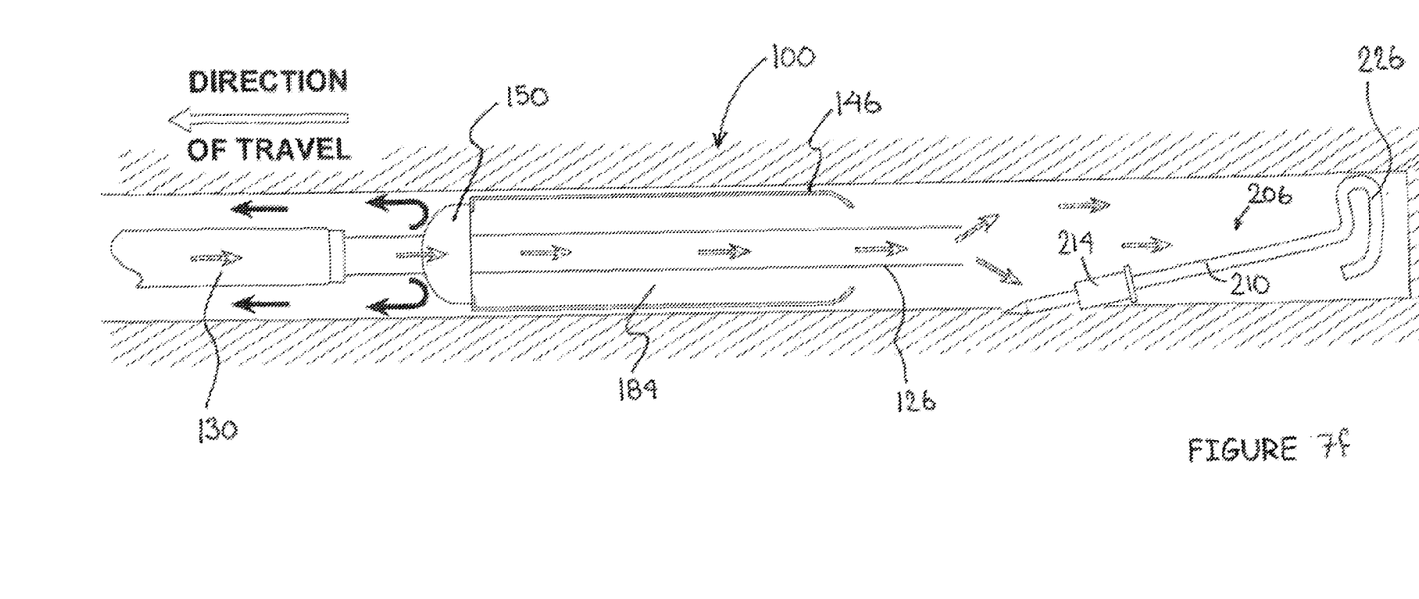
FIG. 7f is a schematic representation of the pipe setting tool of FIG. 2a utilizing the anchor mechanism of FIG. 7c during upstream travel in a borehole.

On insertion into a borehole, bent forward end 226 of pipe hook 206 may act as an anchor by way of engagement with the sidewall of the borehole, thereby preventing movement of pipe hook 206 up-hole on removal of pipe setting tool 100. In other embodiments, pipe hook 206 may be modified with a dedicated anchor mechanism that permits down-hole movement, while preventing up-hole movement. In a non-limiting example, such a dedicated anchor mechanism may be located on pipe hook 206 as shown in FIG. 7a. In this example, the anchor mechanism has one or more barb-like structures 230 affixed to the shaft of pipe hook 206, wherein the barb-like structures 230 exhibits sufficient flexibility to permit down-hole movement, while providing sufficient resilience to prevent up-hole movement on retraction of drill string 130. In another alternate embodiment, the anchor mechanism may be integrated with the bent forward end 226 of pipe hook 206, such as the configuration shown in FIG. 7b where a barb-like structure 234 extends from the terminal region of the pipe hook 206. In yet another embodiment, the anchor mechanism may comprise a spike 232 that extends from plug 214, opposite to shaft portion 210, as detailed in FIG. 7c. As will be appreciated, any number of combinations of anchor mechanisms may be implemented to ensure effective anchorage of geothermal pipe 110 down hole, such as the combination of anchor mechanisms represented in FIGS. 7d and 7e. After pipe hook 206 is ejected from pipe setting tool 100, spike 232 anchors into a wall of the borehole to prevent pipe hook 206 from moving upstream, as shown for example in FIG. 7f.

While described generally with respect to geothermal pipes having a pair of tube sections, the tool may also find application in the down-hole placement of single-tube structures such as those used in open-loop geothermal systems, or for components such as probes and the like. Where single-tube structures are being installed, an eccentric alignment of the tool shaft 126 and tool sleeve 146 may be used, so as to locate the single-tube structure within a channel of the tool that is more centrally located relative to the tool and the borehole.

While pipe setting tool 100 has been shown as having channels 154, 198 that generally conform to a partial circular cross-section, other cross-sectional profiles are contemplated. In an alternate embodiment, a square cross-sectional profile may be used to reduce the surface contact between the channel walls, and the tube sections 114 of the geothermal pipe 110 contained therein. As indicated previously, tube sections 114 slide relative to channels 154, 198 during up-hole movement of pipe setting tool 100. In certain instances, a reduced surface contact provided by an alternate channel configuration may be advantageous. In another alternate embodiment, the channel may be configured with a more ellipsoid or generally irregular cross-sectional profile, as may be dictated by the choice of geothermal pipe 110 and the cross-sectional configuration of the corresponding tube sections 114. In yet another embodiment, one or more channels located on pipe setting tool 100 may include a cover or shield that prevents abrasive contact of the tube sections 114 of geothermal pipe 110 with the borehole during down-hole placement. Further modifications could include surface treatments of at least some of the channels to reduce surface contact and/or friction between the channel and tube sections 114, such as through the inclusion of at least one continuous or intermittent (or staggered) longitudinal rib within the channel, or some other arrangement or channel modification such as surface dimpling.

Figure 8:
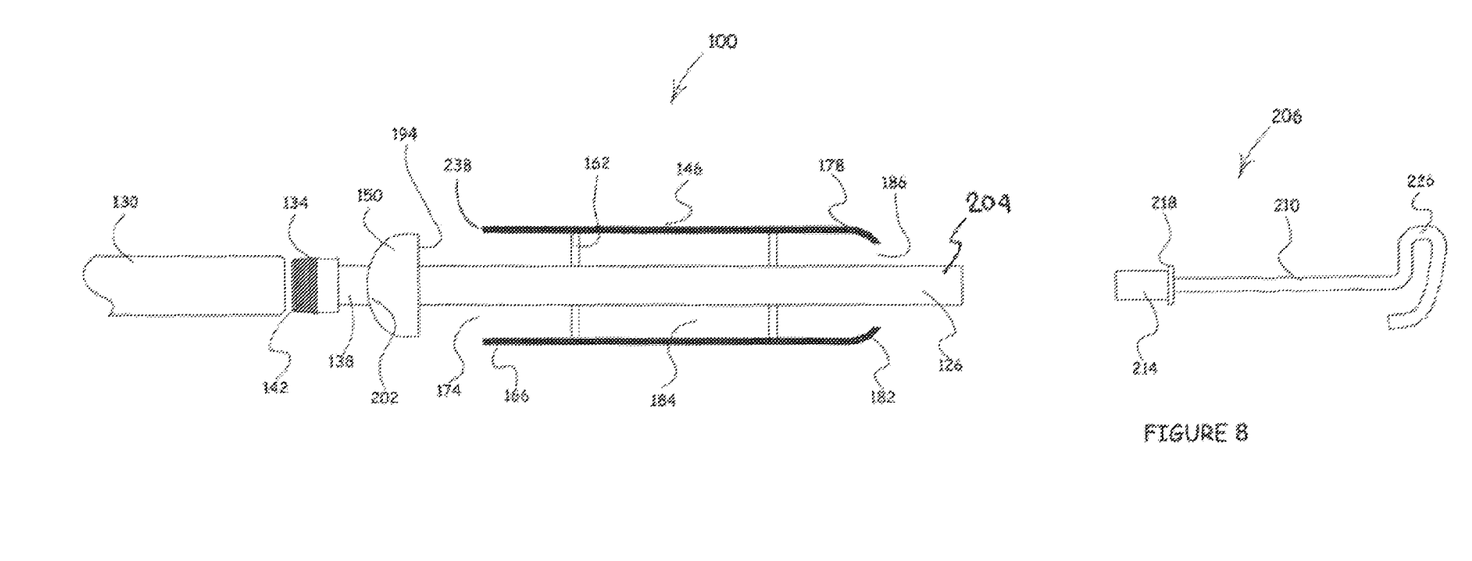
FIG. 8 is a side sectional view of a pipe setting tool in accordance with another embodiment hereof.

Although sliding cap 150 has been described as having shoulder 170 provided on first end 166 of tool sleeve 146 defining sealing surface 190, an alternate embodiment shown in FIG. 8 establishes a different sealing arrangement between seal cap 150 and tool sleeve 146. As shown, to provide a sealing engagement between seal cap 150 and tool sleeve 146, an end face 238 of tool sleeve 146 is configured for direct sealing engagement with sealing surface 194 of seal cap 150. Such a configuration may be implemented where tool sleeve 146 is constructed with a thick wall, or where at least a portion of the wall is of thicker dimension where end face 238 engages the seal cap 150. Tool sleeve 146 may also be provided with a suitable taper (not shown), similar to that provided on second end 178 (as shown in FIG. 3a). Where such a taper is provided, end face 238 may be suitably beveled to establish a sealing alignment between end face 238 of tool sleeve 146, and sealing surface 194 of seal cap 150.

The sliding arrangement of sliding seal cap 150 on tool shaft 126 and the sealing engagement of sliding seal cap 150 with tool sleeve 146 serves as a mechanism to control the flow of drill fluid through space 184, depending on the movement of tool 100 through the borehole. While this configuration has been described above, and detailed in the figures, also contemplated for use are other check-valve type mechanisms that serve to control the passage of drilling fluid through tool 100. In an alternate embodiment, the tool may include one or more one-way flap valves within space 184 that permits flow of drilling fluid upstream through space 184 on down-hole movement of tool 100, while preventing flow of drilling fluid downstream through space 184 on up-hole movement of tool 100. As such, this arrangement would also achieve down-hole movement without hydraulic pressure build-up, while also achieving sufficient sealing to displace drilling fluid on up-hole movement.

While pipe hook 206 has been shown with a particular configuration of bent forward end 226 on shaft portion 210 that is suitable for use with geothermal pipe 110 having an eye loop 122 at elbow 118, other hooking or attachment arrangements are contemplated. In other words, shaft portion 210 may be configured with an alternate hooking or coupling mechanism that permits attachment of the pipe hook to the geothermal pipe in the region of the elbow section.

As described above, seal cap 150 serves to create a piston effect upstream of pipe setting tool 100 during upstream movement, thereby causing drilling fluid to be displaced upstream and out of the borehole. In certain situations, this upstream piston effect may not be necessary or desired, and as such, an operator may want to use tool 100 without seal cap 150, or equivalent sealing structure. For example, where encasement medium 222 is of sufficient density to substantially upwardly displace the drilling fluid contained in the borehole, it may be desirable to use tool 100 primarily for the purpose of setting the geothermal pipe in close proximity to the borehole. An exemplary configuration of tool 100 suitable for such usage is shown in FIG. 9.

Figure 9:
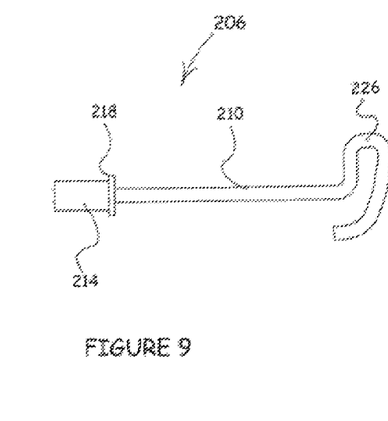
FIG. 9 is a side section view of a pipe setting tool in accordance with a further embodiment hereof.

The embodiment of the pipe setting tool shown in FIG. 9 retains substantially all of the structural aspects of the embodiments of pipe setting tool 100 described above, and shown for example in FIG. 8. The primary difference is the absence of a seal cap on tool shaft 126 in the vicinity of first end 138. A tool 100 of this configuration still provides close conformity of tool sleeve 146 to the walls of the borehole, thereby serving to position each tube section 114 of geothermal pipe 110 in close proximity to the outside diameter of the borehole. As pipe setting tool 100 is pulled in the upstream direction, and with the subsequent pumping of encasement medium 222 downstream of pipe setting tool 100, as shown for example in FIG. 6, the tube sections 114 of geothermal pipe 110 remain spaced apart, and generally untwisted, serving to enhance their thermal conductivity and efficiency.

To provide an operator with the option of either configuration, that is operation either with or without the seal cap, coupler 134 may be removably affixed to first end 138 of tool shaft 126, for example by way of threaded attachment. In this way, in installations where the seal cap 150 is not required, coupler 134 can be detached, and seal cap 150 can be removed (e.g. slid off) from first end 138 of tool shaft 126. In such a configuration of the tool 100, an additional stop collar to prevent the seal cap from directly engaging the coupler would not be present, or alternatively if present, suitably configured to also be removable. A further modification may include an inward taper (not shown) on tool sleeve 146 on first end 166, similar to that provided on second end 178 (as shown for example in FIG. 3a), to facilitate up-stream movement by stabilizing the pipe setting tool 100, as well as centering it during movement in the borehole.

In the embodiments presented above, tool shaft 126 has generally been presented as having a circular cross-section. As will be appreciated, this component of the tool need not be restricted to a circular cross-section, and may be presented, for example as having a rectangular cross-section. Where the tool shaft couples to the upstream drill string, a suitable coupling mechanism would be provided. Similarly, where the tool shaft couples to the downstream pipe hook, a suitable plug for fitting the non-circular configuration can be provided.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. For example, while pipe setting tool 100 has been described as allowing for mounting and positioning of a single geothermal pipe, the tool may be configured to permit the mounting of two or more geothermal pipes. Thus, the breadth and scope of the present invention should not be limited by any of the above-described exemplary embodiments, but should be defined only in accordance with the appended claims and their equivalents. It will also be understood that each feature of each embodiment discussed herein can be used in combination with the features of any other embodiment.

What is claimed is:

1. A pipe setting tool comprising:
   a tool shaft;
   a coupler mounted on a first end of the tool shaft;
   a pipe hook configured for attachment to a second end of the tool shaft;
   a tool sleeve affixed to the tool shaft defining a space therebetween; and
   a seal cap mounted on the tool shaft, the seal cap being moveable to a first position spaced-apart from the tool sleeve during down-hole movement of the tool to permit flow of fluid through the space, the seal cap being moveable towards a second position against the tool sleeve during up-hole movement of the tool to establish a seal with the tool sleeve to prevent fluid flow through the space.

2. The pipe setting tool of claim 1, wherein at least the tool sleeve is configured with at least one channel to receive a geothermal pipe intended for installation within a borehole.

3. The pipe setting tool of claim 1, wherein the pipe hook includes a plug, a shaft portion attached to the plug, and a bent forward end on the shaft portion, the plug being configured as an insert member having a portion with an outside diameter suitable for a slidable fit within the tool shaft.

4. The pipe setting tool of claim 3, wherein the pipe hook is further provided with an anchor mechanism to prevent up-hole movement during installation.

5. The pipe setting tool of claim 1, wherein on a first end of the tool sleeve, there is provided a shoulder defining a sealing surface for sealing engagement with the seal cap in the second position, during up-hole movement of the tool.

6. The pipe setting tool of claim 1, further comprising:
   a stop collar positioned intermediate to the coupler and the tool sleeve, the stop collar defining the first position of the seal cap during down-hole movement, wherein the seal cap is spaced-apart from the tool sleeve.

7. The pipe setting tool of claim 1, wherein a second end of the tool sleeve comprises an inward taper.

8. The pipe setting tool of claim 1, wherein the arrangement of the tool sleeve on the tool shaft establishes an annular space therebetween, as well as first and second annular openings adjacent each end of the tool sleeve to permit fluid communication through the tool.

9. A pipe setting tool comprising:
a tool shaft;
a coupler mounted on a first end of the tool shaft;
a tool sleeve affixed to the tool shaft defining a space therebetween; and
a moveable seal cap mounted on the tool shaft, the seal cap being moveable to a first position spaced-apart from the tool sleeve during down-hole movement of the tool to permit flow of fluid through the space, the seal cap being moveable towards a second position against the tool sleeve during up-hole movement of the tool to establish a seal with the tool sleeve, to prevent fluid flow through the space,
wherein the second end of the tool shaft is dimensioned to receive a consumable pipe hook used to attach a geothermal pipe to the pipe setting tool.

10. The pipe setting tool of claim 9, wherein at least the tool sleeve is configured with at least one channel to receive a geothermal pipe intended for installation within a borehole.

11. The pipe setting tool of claim 9, wherein the tool sleeve and the seal cap are configured with at least one pair of channels to receive a geothermal pipe intended for installation within a borehole.

12. The pipe setting tool of claim 9, wherein on a first end of the tool sleeve, there is provided a shoulder defining a sealing surface for sealing engagement with the seal cap in the second position, during up-hole movement of the tool.

13. The pipe setting tool of claim 9, further comprising:
a stop collar positioned intermediate to the coupler and the tool sleeve, the stop collar defining the first position of the seal cap during down-hole movement, wherein the seal cap is spaced-apart from the tool sleeve.

14. The pipe setting tool of claim 9, wherein a second end of the tool sleeve has an inward taper.

15. The pipe setting tool of claim 9, wherein the arrangement of the tool sleeve on the tool shaft establishes an annular space therebetween, as well as first and second annular openings adjacent each end of the tool sleeve to permit fluid communication through the tool.

16. A pipe setting tool comprising:
a tool shaft;
a coupler mounted on a first end of the tool shaft;
a pipe hook configured for attachment to a second end of the tool shaft; and
a tool sleeve affixed to the tool shaft defining a space therebetween;
wherein said tool sleeve is dimensioned with an outside diameter that ensures close conformity to a borehole, thereby serving to position a geothermal pipe mounted thereto in close proximity to the outside diameter of the borehole and wherein at least the tool sleeve is configured with at least one channel to receive the geothermal pipe intended for installation within the borehole.

17. The pipe setting tool of claim 16, wherein the pipe hook includes a plug, a shaft portion attached to the plug, and a bent forward end on the shaft portion, the plug being configured as an insert member having a portion with an outside diameter suitable for a slidable fit within the tool shaft.

18. The pipe setting tool of claim 16, wherein at least one end of the tool sleeve comprises an inward taper.

19. The pipe setting tool of claim 16, wherein the arrangement of the tool sleeve on the tool shaft establishes an annular space therebetween, as well as first and second annular openings adjacent each end of the tool sleeve to permit fluid communication through the tool.

* * * * *